(12) United States Patent
Sasso

(10) Patent No.: US 10,830,322 B1
(45) Date of Patent: Nov. 10, 2020

(54) ROTARY POSITIONING APPARATUS FOR AN AIMED DEVICE

(71) Applicant: THE AEROSPACE CORPORATION, El Segundo, CA (US)

(72) Inventor: Felix T. Sasso, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/440,336

(22) Filed: Jun. 13, 2019

(51) Int. Cl.
*F16H 35/18* (2006.01)

(52) U.S. Cl.
CPC .................... *F16H 35/18* (2013.01)

(58) Field of Classification Search
CPC ............. F16H 35/18; F16H 2035/005; F16H 2035/006; B23Q 16/06; B23Q 16/10; B23Q 16/102; B23Q 16/105; B23Q 16/107
See application file for complete search history.

(56) References Cited

U.S. PATENT DOCUMENTS

| | | | |
|---|---|---|---|
| 8,193,883 B2 * | 6/2012 | Long ...................... | G02B 7/005 335/179 |
| 10,034,701 B2 * | 7/2018 | Adamiec ............... | B25B 23/141 |
| 10,274,021 B2 * | 4/2019 | Victor .................. | F16D 43/215 |

* cited by examiner

*Primary Examiner* — Adam D Rogers
(74) *Attorney, Agent, or Firm* — Eversheds Sutherland

(57) ABSTRACT

A rotary positioning apparatus can adjust the rotational position of a device to be aimed about a desired axis. It can include an device mount that includes the aimed device. A motor can be coupled to the device mount or a shaft extending from the device mount to generate a rotational force to rotate the device mount. Primary mechanical flexures can be positioned along opposing ends of the device mount to provide a mechanical resistance to the rotation imparted on the device mount by the motor. A brake system can be included to stop rotation of the device mount with or without the motor engaged. Secondary mechanical flexures can be coupled to each of the primary mechanical flexures and constructed of materials that give it a lower torque resistance so that the secondary mechanical flexures can begin rotating before the primary mechanical flexures to provide small angle adjustability.

18 Claims, 7 Drawing Sheets

ROTARY POSITIONING APPARATUS FOR AN AIMED DEVICE

FIELD OF THE DISCLOSURE

The present disclosure is generally directed to positioning mechanisms, and more particularly to a rotary positioning apparatus for a device to be aimed.

BACKGROUND

Conventional rotary positioning devices for optical and non-optical positioning typically use bearings to control the rotation and positioning of the device. Bearings are mechanical devices that achieve rotation by introducing rolling elements (multiple spherical-shaped balls or cylinders). In conventional designs, the individual bearing elements can be positioned between the internal diameter of an outer ring and the external diameter of an inner ring. Unfortunately, bearings can be inadequate to use when precision in the positioning of the device is necessary.

For example, during rotation, bearings exhibit both repeatable and non-repeatable errors in the positioning or orientation of the rotation axis. These errors can be caused by very small differences in the size and shape of the individual bearing elements. These errors can also be caused by the quality of the bearing elements being used and/or slippage between bearing elements during rotation. Further, these errors can be caused by the mounting characteristics of the bearings. In response to these rotational errors, the rotational axis exhibits a wobbling motion identified as an angular runout during rotation.

While some repeatable errors can be compensated for in rotational control devices, such as gimbals, others cannot. Further, non-repeatable errors cannot be anticipated and therefore also cannot be compensated for. This can result in situations where bearings do not provide suitable precision for use as part of a rotational control and positioning apparatus.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE EXAMPLE EMBODIMENTS

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Certain dimensions and features of the example rotary positioning apparatus are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the elements of the rotary positioning apparatus are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom. As used herein, the term "substantially orthogonal" indicates that the perpendicular relationship is not a strict relationship and does not exclude functionally similar variations therefrom.

Figure 1A:
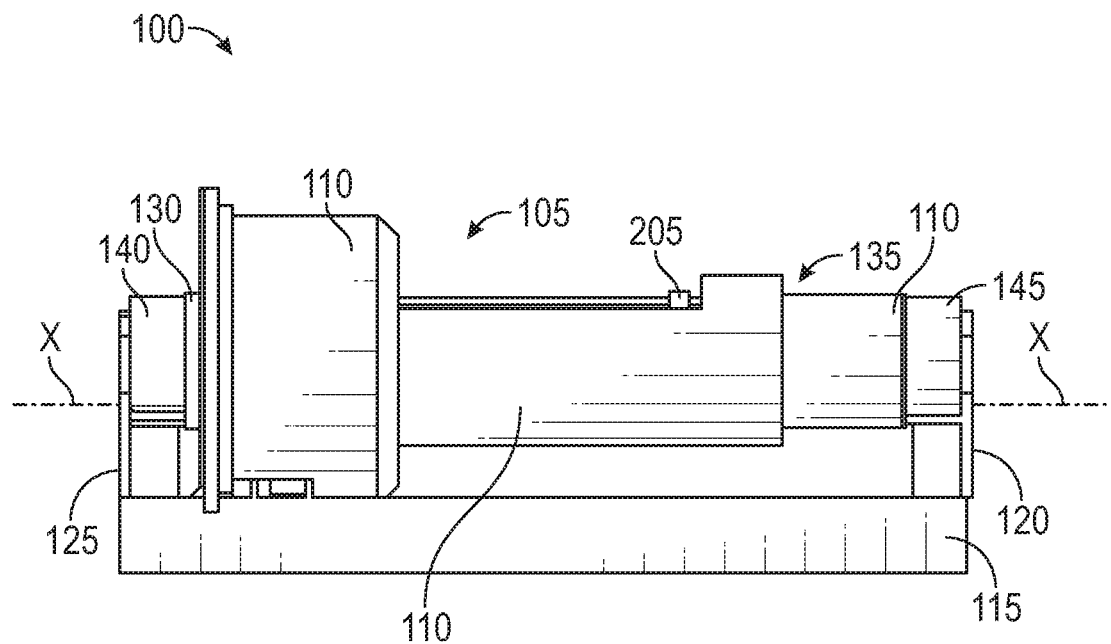
FIG. 1A is a side elevation view of a rotary positioning apparatus, in accordance with one example embodiment of the disclosure.
Figure 1B:
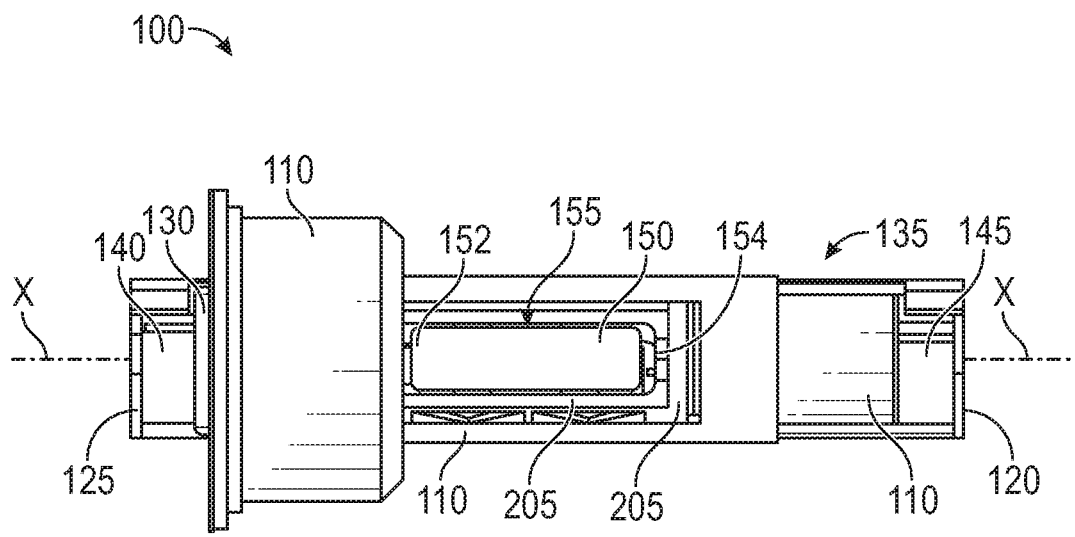
FIG. 1B is top plan view of the rotary positioning apparatus of FIG. 1A, in accordance with one example embodiment of the disclosure.

FIGS. 1A-1B are side and top views of a rotary positioning apparatus 100, in accordance with certain example embodiments of the disclosure. In certain example embodiments, the rotary positioning apparatus 100 can be part of telescope, camera, radio detection and ranging (Radar), or any other device where precision pointing is desired, in an aerial, orbiting, inter-planetary, or inter-stellar device, such as, for example, an airplane, drone, weather balloon, satellite, space station, space telescope, rocket, another craft configured to operate in the air or in orbit around a planet or in space, or the like. In other example embodiments, the rotary positioning apparatus 100 can be included in land-based devices such as telescopes, cameras, radio detection and ranging (Radar), vehicles, boats (whether above or below surface), other marine applications, or any other device where precision pointing is desired.

Referring now to FIGS. 1A-1B, the example rotary positioning apparatus 100 can include a device mounting platform or device mount 110 that includes a cavity and extends along a majority of the longitudinal axis X of the rotary positioning apparatus 100. In one example, the exterior wall of the device mount 110 defines the cavity within the device mount 110. In one example embodiment, the device mount 110 can be an outer housing casing having a circular or substantially circular cross-sectional shape to the X-axis and the cavity can also have a circular or substantially circular cross-sectional shape to the X-axis.

The cavity of the device mount 110 can be configured to receive therein a number of components of the rotary positioning apparatus 100. For example, the cavity of the device mount 110 can be sized and shaped to receive a motor (e.g., rotary motor, linear actuator, or any other type of motor known to those of ordinary skill in the art) therein for adjusting the rotational position of a device, such as, for example a device 150 (e.g., an optical device, antenna, laser, array, or another device that it is desirable to point in a particular direction) about the X-axis. In addition, the cavity of the device mount 110 can be sized and shaped to receive additional elements including, but not limited to, all or a portion of the rotary position measuring device (e.g., encoder, resolver, potentiometer, inductosyn, Hall-effect sensor, gyroscope, or any other device that is capable of measuring the angular displacement of the device mounting platform relative to the stationary, non-rotating portion of the rotary positioning apparatus), shafts, mechanical flexures, and other components, some of which will be described in additional detail below. In certain example embodiments, the device mount 110 can include an opening 155 through the outer wall of the side of the device mount 110 that provides a passageway from the side of the device mount 110 into the cavity defined by the device mount 110. Alternatively, the device mount 110 can be fixedly or removably coupled to the device mounting platform 105 or can be integrally formed with the device mounting platform 105. The device mount 110 can be constructed of metal, alloy, plastic, composite, a combination of these materials, or any other materials currently available or developed in the future and known to those of ordinary skill in the art.

The rotary positioning apparatus 100 can also include a device mounting platform 105. The device mounting platform 105 can be configured to house or be used as a mount for a device 150 to be pointed by the rotary positioning apparatus 100. In one example, the device to be pointed or "aimed device" can be an optical device. Alternatively, any other device desired to be pointed, such as, for example, an antenna, a laser, an array, etc., can be mounted to the device mounting platform 105. In one example, the optical device is a mirror. Alternatively, the optical device can be a lens or any other form of optical device. The device 150 can include a first end 152 and a distal second end 154. The device mounting platform 105 can be positioned within the cavity of the device mount 110 and can be positioned along or adjacent the opening 155 in the outer side wall of the device mount 110. The device mounting platform 105 can be constructed of metal, alloy, plastic, composite, a combination of these materials, or any other materials currently available or developed in the future and known to those of ordinary skill in the art. Additional features of the device mounting platform 105 and the device 150 will be described in additional detail below.

The rotary positioning apparatus 100 can also include a first primary mechanical flexure 130 (a first mechanical flexure). In one example, the first primary mechanical flexure 130 is positioned at least partially within the cavity of the device mount 110. The first primary mechanical flexure 130 can be coupled along a first end to a shaft (shown and described below). In certain example embodiments, the first primary mechanical flexure 130 can be coupled along its second distal end to the device mount 110 and a first secondary mechanical flexure 140 (a second mechanical flexure), which can be coupled along its opposing end to a second mounting arm 125 of a payload mount (as described below). In other example embodiments, the second distal end of the first primary mechanical flexure 130 can be coupled to the device mount 110 and the second mounting arm 125 of the payload mount and the first secondary mechanical flexure 140 may not be included.

The rotary positioning apparatus 100 can also include a second primary mechanical flexure 135 (a third mechanical flexure). In one example, the second primary mechanical flexure 135 is positioned at least partially within the cavity of the device mount 110. The second primary mechanical flexure 135 can be coupled along a first end to a second shaft (shown and described below). In certain example embodiments, the second primary mechanical flexure 135 can be coupled along its second distal end to the device mount 110 and a second secondary mechanical flexure 145 (a fourth mechanical flexure), which can be coupled along its opposing end to a first mounting arm 120 of the payload mount. In other example embodiments, the second distal end of the second primary mechanical flexure 135 can be coupled to the device mount 110 and the first mounting arm 120 of the payload mount and the second secondary mechanical flexure 145 may not be included. Example embodiments of the first primary mechanical flexure 130, second primary mechanical flexure 135, first secondary mechanical flexure 140, and second secondary mechanical flexure 145 will be described with additional detail below.

The payload mount can provide one or more mounting surfaces for mounting the rotary positioning apparatus 100 to the machine/apparatus that the apparatus 100 is installed in. In one example, the payload mount can include a mounting plate 115. The mounting plate 115 can include a planar or substantially planar top and bottom surface; however other surface shapes are also contemplated and within the scope of this disclosure. The mounting plate 115 can also include one or more mounting holes (not shown) for coupling the mounting plate 115 to the machine/apparatus that the rotary positioning apparatus 100 is installed in. The payload mount can also include a first mounting arm 120 and a second mounting arm 125. Each of the first mounting arm 120 and second mounting arm 125 can extend up from the top surface of the mounting plate 115 in a vertical or substantially vertical direction. Further, each of the first mounting arm 120 and second mounting arm 125 can include one or more holes or apertures for coupling the rotary positioning apparatus 100 to the payload mount.

Each of the first mounting arm 120 and the second mounting arm 125 can include planar or substantially planar outer and inner side surfaces for mounting other devices thereto. In certain example embodiments, the first mounting arm 120 can be optionally coupled to either the device mount 110 and second primary mechanical flexure 135 (in examples where a second secondary mechanical flexure 145 is not included) or to the second secondary mechanical flexure 145 and the second mounting arm 125 can be optionally coupled to either the device mount 110 and the first primary mechanical flexure 130 (in examples where a first secondary mechanical flexure 140 is not included) or the first secondary mechanical flexure 140.

Figure 2A:
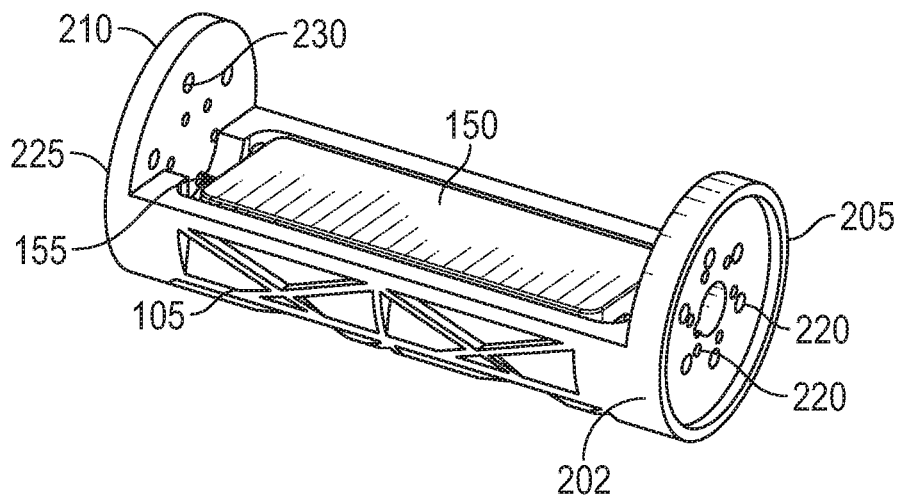
FIG. 2A is a perspective view of a device mounting platform for use in the rotary positioning apparatus of FIG. 1A, in accordance with one example embodiment of the disclosure.
Figure 2B:
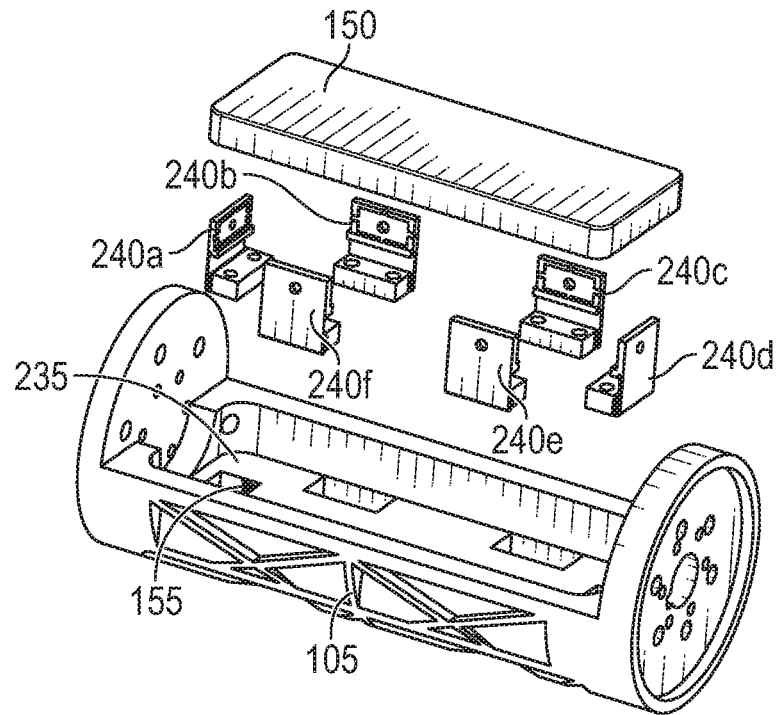
FIG. 2B is an exploded view of the device mounting platform of FIG. 2A, in accordance with one example embodiment of the disclosure.

FIGS. 2A-2B present perspective and exploded view of one example of the device mounting platform 105 for use in the rotary positioning apparatus 100 of FIG. 1A, in accordance with one example embodiment of the disclosure. Now referring to FIGS. 2A-2B, the example device mounting platform 105 can include an outer wall 202 that extends from a first end 210 of the device mounting platform 105 to a distal second end 205 of the device mounting platform 105. In one example, the device mounting platform 105 can generally have a cylindrical shape with a portion of the outer wall 202 removed between the first end 210 and the second end 205 to expose the cavity 155. Alternatively, the device mounting platform 105 can have any other shape. In one example, the portion of the outer wall 202 removed is in the range of substantially 30 degrees to substantially 250 degrees about a circumference of the device mounting platform 105 and more preferable in the range of substantially 120 degrees to substantially 220 degrees about a circumference of the device mounting platform 105. The outer wall 202 can extend circumferentially about the device mounting platform 105. For example, the outer wall 202 can extend between the first end 210 and the second end 205 along the outer edges of each.

The first end 210 of the device mounting platform 105 can have a cylindrical or substantially cylindrical shape. Alternatively, the first end 210 can have any other shape. The first end 210 can include a first mounting surface 225 disposed along the outer surface of the first end 210. In one example, at least a portion of the first mounting surface 225 can be flat or substantially flat and can include multiple mounting apertures 230 that extend through the first end 210. Alternatively, the first mounting surface 225 can have any other shape or topography profile. The mounting apertures 230 can be threaded, recessed, through-holes or any combination of these. In one example, the mounting apertures 230 are configured to receive a coupling device (e.g., screw, bolt, rivet, adhesive, or any other materials known to those of ordinary skill in the art) therethrough or thereon to couple the first end 210 to a first shaft (see FIGS. 4-5) as will be discussed in additional detail below.

The second end 205 of the device mounting platform 105 can have a cylindrical or substantially cylindrical shape. Alternatively, the second end 205 can have any other shape. The second end 205 can include a second mounting surface 215 disposed along the outer surface of the second end 210 and facing in a direction opposite that of the first mounting surface 225. In one example, the second mounting surface 215 can include a flat or substantially flat portion and can include multiple mounting apertures 220 that extend through the second end 205. Alternatively, the second mounting surface 215 can have any other shape or topography profile. The mounting apertures 220 can be threaded, recessed, through-holes, or any combination of these. In one example, the mounting apertures 220 are configured to receive a coupling device (e.g., screw, bolt, rivet, adhesive, or any other materials known to those of ordinary skill in the art) therethrough or thereon to couple the second end 205 to a second shaft (see FIGS. 4-5) as will be discussed in additional detail below.

The device mounting platform 105 can include a mounting surface 235. In one example, the mounting surface 235 is disposed within the recessed cavity 155 of the device mounting platform 105. Alternatively, the device mounting platform 105 may not include a cavity and the mounting surface 235 can be disposed along an outer surface of the device mounting platform 105. As shown in FIG. 2B, the device 150 (e.g., an optical device, antenna, laser, array, or another device that it is desirable to point in a particular direction) that will be coupled to the device mounting platform 105 for directional aiming can be coupled to the mounting surface 235 using one or more device mounting clips 240a-240f. In the example embodiment of FIG. 2B, six clips 240a-240f are shown. However, this is for example purposes only as greater or lesser numbers of device mounting clips 240a-240f can be used in other example embodiments.

Figure 2C:
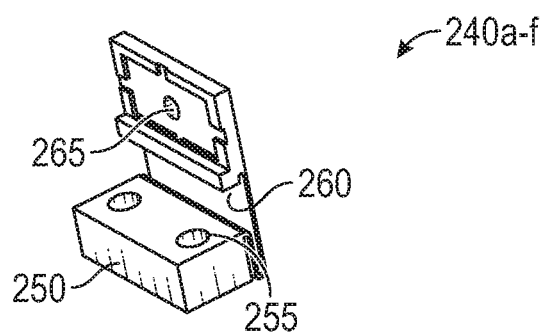
FIG. 2C is a perspective view of a device mounting clip used in the device mounting platform of FIG. 2A, in accordance with one example embodiment of the disclosure.

Each device mounting clip 240a-240f can be coupled to the mounting surface 235 and also coupled to a portion of the device 150 (e.g., an optical device, antenna, laser, array, or another device) or a frame or holder of the device 150. As shown in FIG. 2C, each device mounting clip 240a-240f can include a base member 250 and a vertically extending flange member 260 that can be coupled to or integrally formed with the base member 250. The base member 250 can include one or more apertures 255 for receiving a coupling device (e.g., screw, bolt, rivet, adhesive, or any other materials known to those of ordinary skill in the art) therethrough or thereon to couple the base member 250 to the mounting surface 235. Alternatively, the base member 250 can include a surface without apertures 255 for use of other coupling devices (e.g., screw, bolt, rivet, adhesive, or any other materials known to those of ordinary skill in the art) to couple the base member 250 to the mounting surface 235. The mounting apertures 255 can be threaded, recessed, through-holes, or any combination of these. The vertically extending flange member 260 can extend generally upward from the base member 250. The vertically extending flange member 260 can also include one or more mounting apertures 265 for receiving a coupling device (e.g., screw, bolt, rivet, adhesive, or any other materials known to those of ordinary skill in the art) therethrough or thereon to couple the flange member 260 to a portion of the device 150 or a frame or holder of the device 150. The mounting apertures 220 can be threaded, recessed, through-holes, or any combination of these.

Figure 3A:
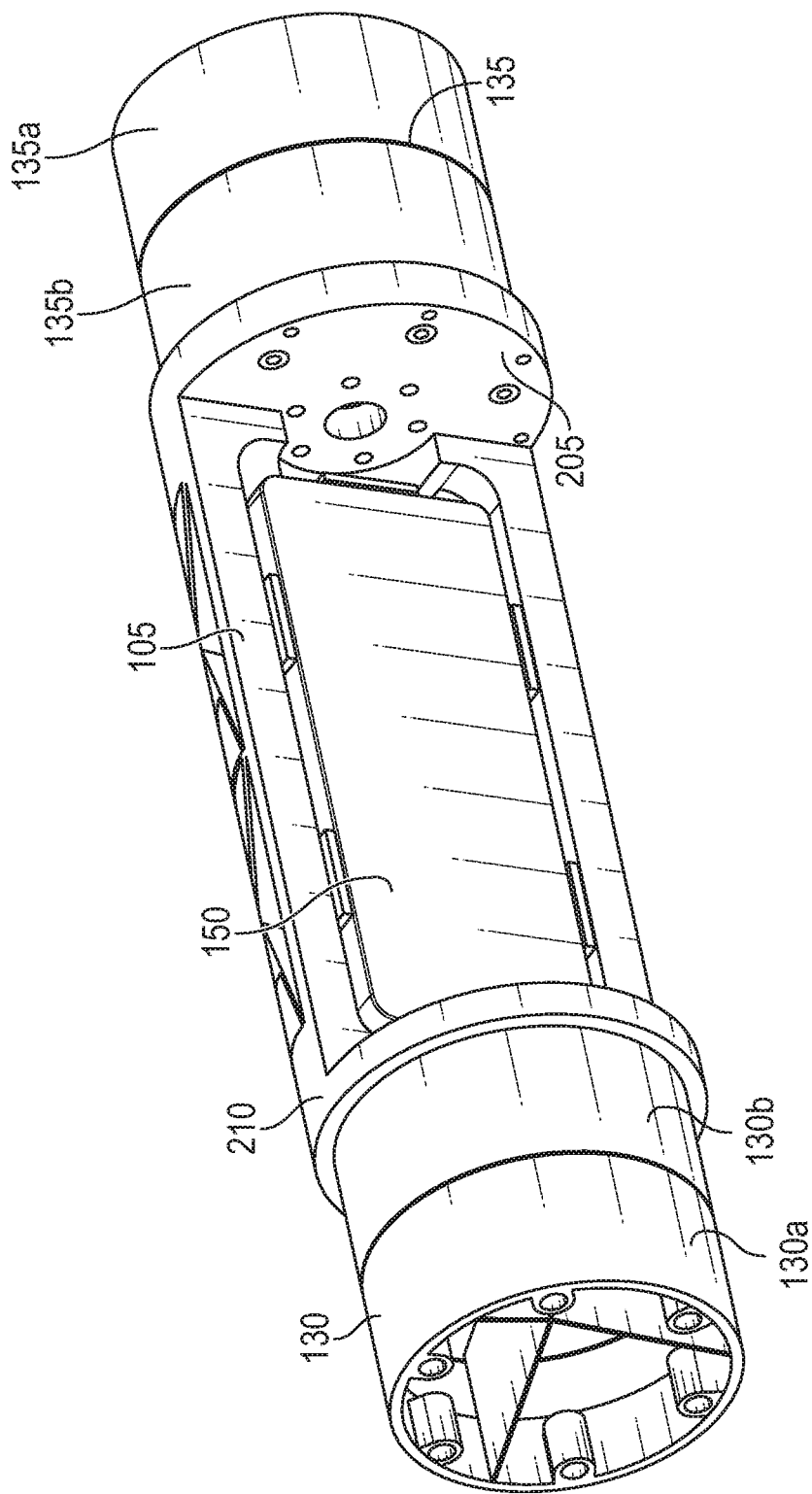
FIG. 3A is a perspective view of the primary mechanical flexures and the device mounting platform for the rotary positioning apparatus of FIG. 1A, in accordance with one example embodiment of the disclosure.

FIGS. 3A-3D present various views of the primary mechanical flexures 130, 135 incorporated into the rotary positioning apparatus 100 of FIG. 1A. FIG. 3A is not to scale and does not include the first shaft and the second shaft, as discussed above, that each of the first primary mechanical flexure 130 and the second primary mechanical flexure 135 respectively are coupled to. Referring to FIGS. 1A-1B and 3A-3D, each primary mechanical flexure 130, 135 can include two sections, a stationary or static section and a rotational section that rotates with regard to the static section. For example, the first primary mechanical flexure 130 can include a stationary section 130a and a rotational section 130b. The second primary mechanical flexure 135 can include a stationary section 135a and a rotational section 135b. In one example, each of the stationary sections 130a, 135a can be positioned axially farther away from the aimed device 150 along the axis X than each of the corresponding rotational sections 135b. Further, in one example, the rotational section 130b can be coupled to the first shaft (see FIGS. 4-5) and the rotational section 135b can be coupled to the second shaft. The stationary section 130a is coupled to the device mount 110 and the first secondary mechanical flexure 140 and the stationary section 135a is coupled to the device mount 110 and the second secondary mechanical flexure 145.

In operation, the rotating section 130b, 135b, of each primary mechanical flexure 130, 135 rotates, while the stationary sections 130a, 135a remain stationary. Each primary mechanical flexure 130, 135 provides mechanical resistance to rotation away from a central null point in either direction about the X-axis. In one example, that null point can be considered zero degrees of rotation. This mechanical resistance may be used in combination with other parts of the rotary positioning apparatus 100 to provide an increasing level of resistance (as the angle away from the null point increases) to the rotation of the aimed device 150 about the axis X in either direction to a desired angle with respect to its resting position or null point. Under rotation, the primary mechanical flexures 130, 135 provide a source of stored energy that allows the aimed device 150 to return to its null point or zero degrees of rotation with a minimum level of torque added by a motor or brake (see FIGS. 4-5) during the return process. While the example embodiments herein describe a couple examples of mechanical rotary flexures that could be used, that description is not intended to be limiting, as any other type of mechanical rotary flexure known to those of ordinary skill in the art may be substituted for the primary mechanical flexures 130, 135 and the secondary mechanical flexures 140, 145 described herein.

Desirable characteristics of the primary mechanical flexures 130, 135 include high axial and radial stiffness. In addition, it is desirable that the central compliant axis 320 of the primary mechanical flexure 130, 135 be substantially stationary throughout rotation of the rotating sections 130b, 135b with respect to the stationary sections 130a, 135a about the axis X. Also, since the primary mechanical flexures 130, 135 are bearingless the use of the primary mechanical flexures 130, 135 eliminates friction, increases reliability, increases cleanliness, and eliminates issues that occur at cryogenic temperatures, as compared to bearings.

Figure 3C:
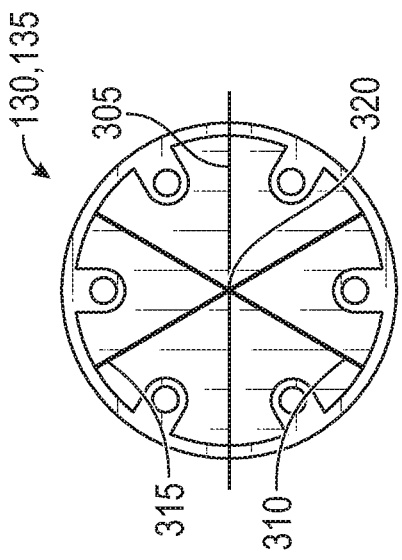
FIG. 3C is a top plan view of the primary mechanical flexure of FIG. 3A, in accordance with one example embodiment of the disclosure.
Figure 3B:
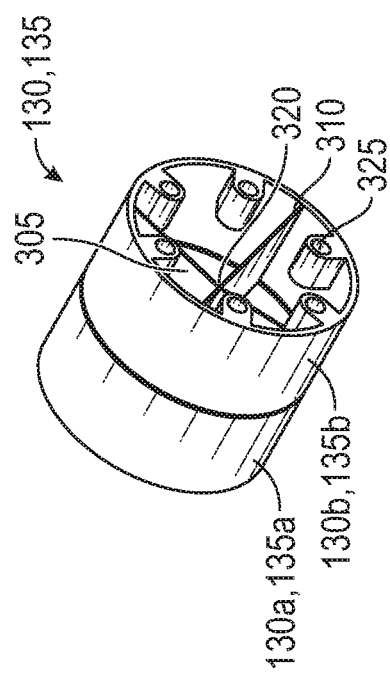
FIG. 3B is a perspective view of the primary mechanical flexure of FIG. 3A, in accordance with one example embodiment of the disclosure.
Figure 3D:
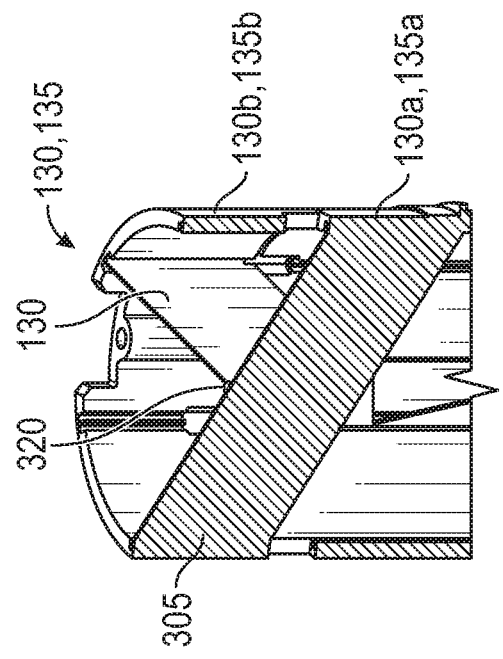
FIG. 3D is a partial cross-sectional view of the primary mechanical flexure of FIG. 3A in accordance with one example embodiment of the disclosure.

As best shown in FIGS. 3B-3D, in one example, the primary mechanical flexure 130, 135 can be a tri-foil flexure in references to the three blades 310, 315, 305 that extend through the common central axis (also referred to as a hex-foil if each portion extending from the common central axis 320 is considered a separate and distinct blade). In other example embodiments, the primary mechanical flexure 130, 135 can be a bi-foil (e.g., two blades (also referred to as a quad-foil if each portion extending from the common central axis 320 is considered a separate and distinct blade)) a quad-foil flexure (e.g., four blades (also referred to as a oct-foil or eight blade foil if each portion of the blade extending from the common central axis 320 is considered a separate and distinct blade)), or the like. The stationary section 130a, 135a is operably coupled to the corresponding rotational section 130b, 135b by a tri-foil blade (foil) configuration shown in FIG. 3C. In the tri-foil blade configuration three blades (foils) 310, 315, 305 pass through or extend out from common central axis 320. The blades 310, 315, 305 can be spread symmetrically or asymmetrically about the common central axis 320. In certain example embodiments, the common central axis 320 is aligned with or parallel with the longitudinal axis X of the rotary positioning apparatus 100. Each of the blades (foils) 310, 315, 305 are angled alternately upwardly and downwardly as they emanate from the common central axis 320. Thus, a first portion of the three blades 310, 315, 305 is connected to the rotational section 130b, 135b, and a second portion of the three blades (foils) 310, 315, 305 are connected to the stationary section 130a, 135a.

In certain example embodiments, the tri-foil blade configuration of blades 310, 315, 305 may be constructed from a single piece of material through a suitable machining process. One example of a suitable machining process for making the tri-foil blade configuration is sink electrodischarge machining. In other example embodiments, the tri-foil blade configuration could be made from multiple pieces of material and/or from other machining processes known to those or ordinary skill in the art. The primary mechanical flexures 130, 135 have been found to have lower peak stress for a given size and deflection angle and are also found to have suitable characteristics in terms of stiffness and torque levels when the rotational section 130b, 135b is rotated with respect to the corresponding stationary section 130a, 135a.

Figure 4:
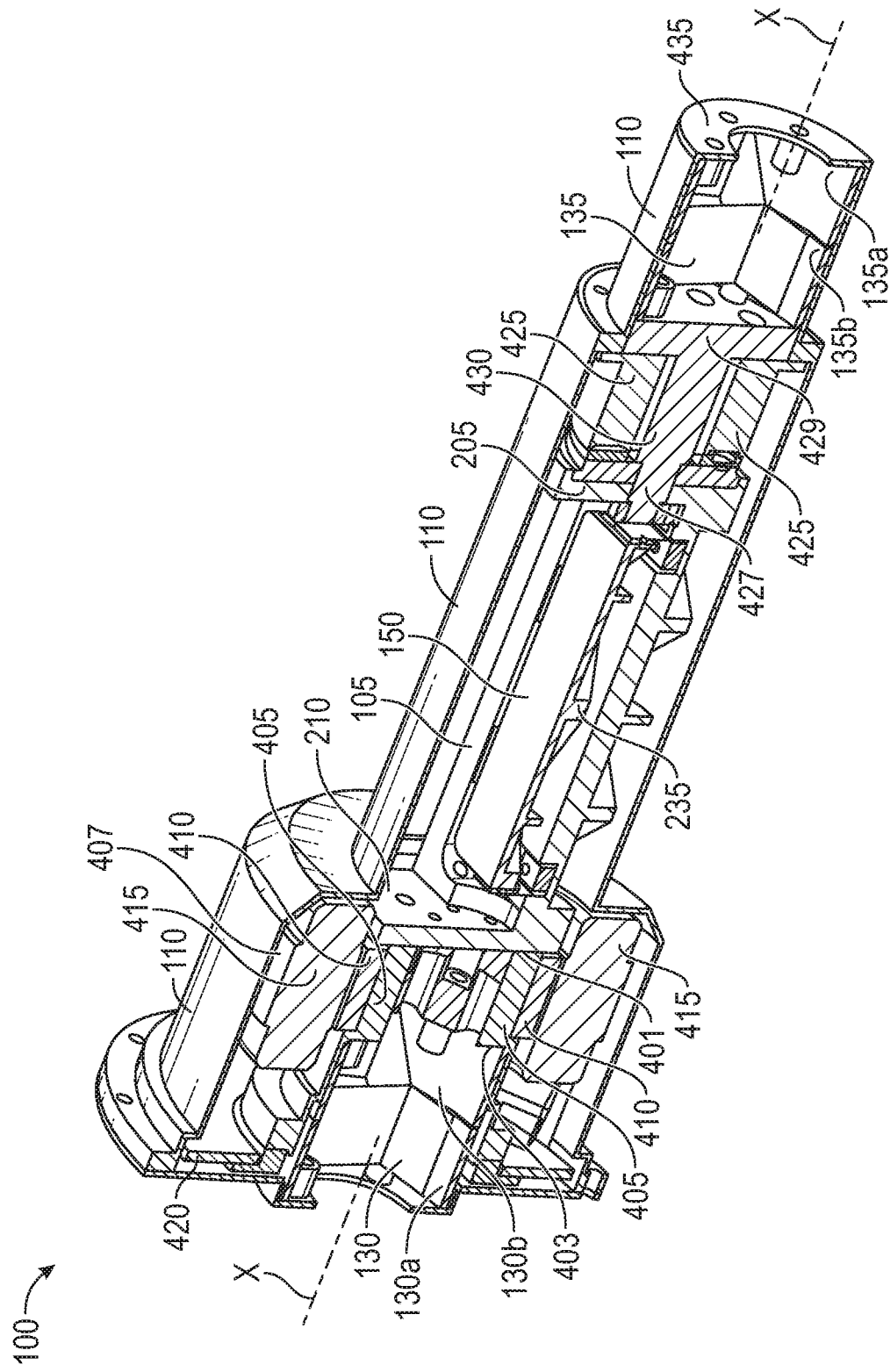
FIG. 4 is a partial cross-sectional view of one example of the rotary positioning apparatus of FIG. 1A, in accordance with one example embodiment of the disclosure.

FIG. 4 is a partial cross-sectional view of one example of the rotary positioning apparatus 100 of FIG. 1A, in accordance with one example embodiment of the disclosure. Now referring to FIGS. 1A-4, the example rotary positioning apparatus 100 can include the device mount 110 having the device mounting platform 105 with the aimed device 150 positioned on or within the device mounting platform 105, as described with reference to FIGS. 2A-2C. A first shaft 405 can include a first end 401 and a distal second end 403. The first end 401 of the first shaft 405 can be coupled to the first end 210 of the device mounting platform 105 via at least a portion of the mounting apertures 230 and corresponding coupling devices (e.g., screw, bolt, rivet, adhesive, or any other materials known to those of ordinary skill in the art) positioned through the mounting apertures 230. The second end 403 of the first shaft 405 can extend axially from the first end 210 away from the device mounting platform 105 along the longitudinal axis X. In one example, the first shaft 405 can be cylindrical, however, in other example embodiments, the first shaft 405 can have other shapes. Further the first shaft 405 can be solid or include a hollow channel axially extending along a portion or the entire length of the first shaft 405.

A motor 407 can be positioned adjacent to the first shaft 405. For example, the motor 407 or a portion of the motor can be positioned about the first shaft 405. The motor 407 can be electrically coupled to a power source (not shown). The power source can be either alternating current (A/C) or direct current (D/C) and, for example, can include a rechargeable power source, such as a rechargeable battery.

The motor 407 can also be communicably coupled to a controller and/or computing device (not shown) for controlling the rotation of the first shaft 405 and ultimately the rotation of the device mounting platform 105 and the aimed device 150. The controller and/or the computing device can include or can be communicably coupled to one or more processors. The one or more processors may be implemented, as appropriate, in hardware, software, firmware, or combinations thereof. Software or firmware implementations of the one or more processors may include computer-executable or machine-executable instructions written in any suitable programming language to perform the various functions described. Hardware implementations of the processors may be configured to execute computer-executable or machine-executable instructions to perform the various functions described. In example embodiments, the processors may be configured to execute instructions, software, and/or applications stored in memory (not shown) that is communicably coupled to the one or more processors. The one or more processors may include, without limitation, a central processing unit (CPU), a digital signal processor (DSP), a reduced instruction set computer (RISC), a complex instruction set computer (CISC), a System-on-a-Chip (SoC), a microprocessor, a microcontroller, a field programmable gate array (FPGA), or any combination thereof.

The motor 407 can be any type of A/C or D/C motor. The motor 407 can include a rotor 410 disposed about the radial circumference of the first shaft 405 and coupled or otherwise mounted to the first shaft 405. The motor 407 can also include a stator 415. The stator 415 can be coupled to the device mount 110 in certain example embodiments. In other example embodiments, the stator 415 can be coupled to the mounting arm 125 or the mounting plate 115. The stator 415 can define a hollow cylinder within which the rotor 410 and at least a portion of the first shaft 405 is positioned. The rotor 410 is operable to rotate within the stator 415 (which remains static or stationary) during operation of the motor 407 to generate a rotation in the first shaft 405 in either direction about the longitudinal axis X. The rotation of the first shaft 405 by the motor 407 causes a corresponding rotation in the device mounting platform 105 coupled to the first shaft 405 and a corresponding rotation in the aimed device 150 coupled to the device mounting platform 105.

The second end 403 of the first shaft 405 can be coupled to the first primary mechanical flexure 130. The first primary mechanical flexure 130 can be substantially the same as that shown and described in FIGS. 3A-3D or any other type of mechanical flexure. In one example, the rotational section 130b of the first primary mechanical flexure 130 can be coupled to the second end 403 of the first shaft 405 with one or more coupling devices (e.g., screws, bolts, rivets, adhesive, or any other materials known to those of ordinary skill in the art). In certain example embodiments, the stationary section 130a of the first primary mechanical flexure 130 can be coupled to the device mount 110. In another example embodiment, the stationary section 130a of the first primary mechanical flexure 130 can be coupled to the device mount 110 and a first secondary mechanical flexure 140, as described with reference to FIG. 5.

The rotary positioning apparatus 100 can also include a rotary position measuring device (e.g., encoder, resolver, potentiometer, inductosyn, Hall-effect sensor, any combination thereof, or any other device that is capable of measuring the angular displacement of the device mounting platform 105 relative to the stationary, non-rotating portion of the rotary positioning apparatus 100). The purpose of the rotary position measuring device is to provide a measure of the angular displacement of the device mounting platform 105 and the aimed device 150 mounted thereon relative to the stationary, non-rotating portion of the rotary positioning apparatus 100. In one example, the rotary position measuring device can include at least one stationary part and at least one rotating part. The stationary part of the rotary position measuring device can be mechanically coupled to the mounting arm 125 and/or the mounting plate 115. The rotating part of the rotary position measuring device can be mechanically coupled to the first or second shaft 405 via a hub. The power source for the rotary position measuring device can either be A/C or D/C and, for example, can include a rechargeable power source, such as a rechargeable battery. The rotary position measuring device can also be communicably coupled to the controller and/or computing device (not shown) much like the motor 407 for controlling and determining the rotational or angular position of the device mounting platform 105 and the aimed device 150 mounted thereon for the rotary positioning apparatus 100. In example embodiments, the rotary position measuring device can measure position, velocity, acceleration, or other higher order angular measurements that can be used by the rotary position controller (not shown) to control the aimed device's angular position about the X-axis. Examples of rotary position measuring devices can include, but are not limited to, encoders, resolvers, potentiometers, Hall-effect sensors, and/or inductosyns, any combination thereof, or any other device that is capable of measuring the angular displacement of the device mounting platform 105 and the aimed device 150 mounted thereon relative to the stationary, non-rotating portion of the rotary positioning apparatus 100. The rotary position measuring device can be electrical, mechanical, optical, or magnetic in nature.

Figure 5:
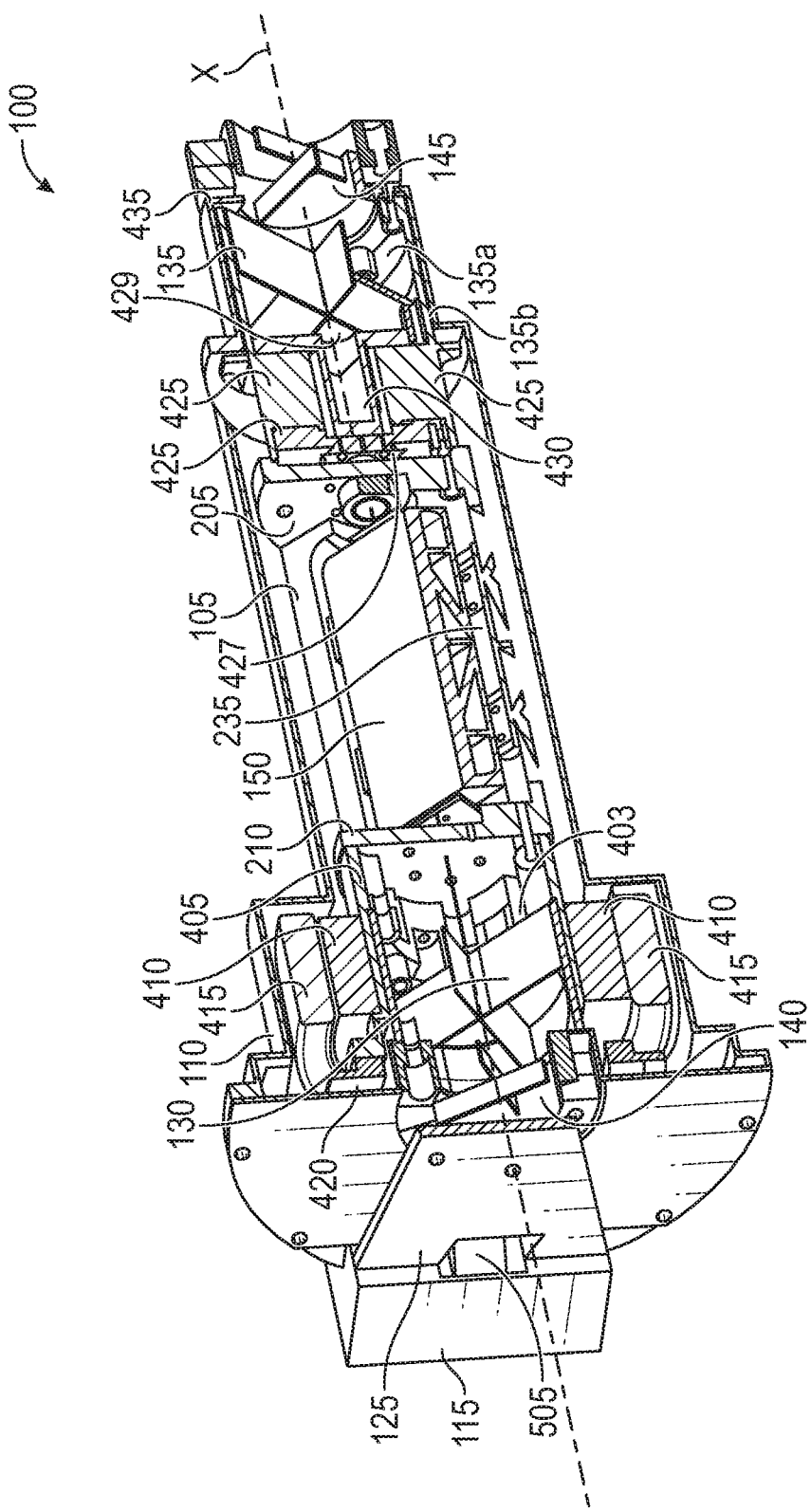
FIG. 5 is another partial cross-sectional view of another example of the rotary positioning apparatus of FIG. 1, in accordance with another example embodiment of the disclosure.

In the example provided herein in the figures and described below, the rotary position measuring device is an encoder; however, this is for example purposes only as any other type of rotary position measuring device, including those discussed herein, may be substituted for the encoder described below. The encoder can include an encoder wheel 420. The encoder wheel 420 can be coupled to the first shaft 405 via a hub. The encoder can further include an encoder head (not shown) an example of which is shown in FIG. 5. The encoder head can be electrically coupled to a power source (not shown) and mechanically coupled to the mounting arm 125 and/or the mounting plate 115 or another stationary mounting area. The power source can be either A/C or D/C and, for example, can include a rechargeable power source, such as a rechargeable battery. The encoder head can also be communicably coupled to the controller and/or computing device (not shown) much like the motor 407 for controlling the position of the device mounting platform 105 and the aimed device 150 mounted thereon. The encoder head can monitor the rotational position of the encoder wheel 420 to determine the amount of rotation of the first shaft 405 about the longitudinal axis X and correspondingly the amount of rotation of the device mounting platform 105 and aimed device 150 therein or thereon about the longitudinal axis X. In one example, the encoder is an optical encoder; however, other types of encoders may be alternatively used.

The rotary positioning apparatus 100 can also include a second shaft 430 coupled to the second end 205 of the device mounting platform 105. The second shaft 430 can include a first end 427 and a distal second end 429. The first end 427 of the second shaft 430 can be coupled to the second end 205 of the device mounting platform 105 via at least a portion of the mounting apertures 220 and corresponding coupling devices (e.g., screw, bolt, rivet, adhesive, or any other materials known to those of ordinary skill in the art) positioned through the mounting apertures 220. The second end 429 of the second shaft 430 can be coupled to the rotating section 135b of the second primary mechanical flexure 135 and a brake system 425. The second end 429 of the second shaft 430 can extend axially from the second end 205 away from the device mounting platform 105 along the longitudinal axis X and in a direction opposite the direction of extension of the first shaft 405. In one example, the second shaft 430 can be cylindrical, however, in other example embodiments, the second shaft 430 can have other shapes. Further the second shaft 430 can be solid or include a hollow channel axially extending along all or a portion of the entire length of the second shaft 430.

The rotary positioning apparatus 100 can also include a brake system 425. The brake system 425 can be electrically coupled to a power source (not shown). The power source can be either A/C or D/C and, for example, can include a rechargeable power source, such as a rechargeable battery. The brake system 425 can also be communicably coupled to the controller and/or computing device (not shown), much like the motor 407, for controlling the rotational position of the device mounting platform 105 and the aimed device 150 mounted thereon.

The brake system 425 can include a first portion coupled to the device mount 110 or another mounting surface that will not rotate when the motor 407 applies a rotational torque to the first shaft 405. Another portion of the brake system 425 can be coupled to the second end 205 of the device mounting platform 105 and/or the second shaft 430. The brake system 425 includes a brake armature that can employ a frictional force on the device mounting platform 105 or second shaft 430 to stop or prevent rotation of the device mounting platform 105. The energizing of the brake system 425 to stop rotation of the device mounting platform 105 can occur when the controller and/or computing device have determined, based on information from the rotary position measuring device, that the device mounting platform 105 and the aimed device 150 therein or thereon has been rotated to the desired angular position (and optionally an additional determined amount past the desired angular position) about the longitudinal axis X. In certain example embodiments, once the brake system 425 is applied to stop rotation or to hold the device mounting platform 105 and the aimed device 150 in place, the motor 407 will not need to continue applying a rotational force on the first shaft 405 to maintain the position of the device mounting platform 105 against the stored rotational energy in the first primary mechanical flexure 130 and the second primary mechanical flexure 135.

The second primary mechanical flexure 135 can be substantially the same as that shown and described in FIGS. 3A-3D or alternatively can be any other type of mechanical flexure known to those of ordinary skill in the art. In one example, the rotational section 135b of the second primary mechanical flexure 135 can be coupled to the second end 429 of the second shaft 430 with one or more coupling devices (e.g., screw, bolt, rivet, adhesive, or any other materials known to those of ordinary skill in the art). In certain example embodiments, the stationary section 135a of the second primary mechanical flexure 135 can be coupled to the mounting end 435 of the device mount 110. In another example embodiment, the stationary section 135a of the second primary mechanical flexure 135 can be coupled to the mounting end 435 of the device mount 110 and a second secondary mechanical flexure 145, as described with reference to FIG. 5.

Referring to FIG. 4, in operation, the motor 407 can receive a signal from the controller or processor to adjust the angular position of the aimed device 150. The motor 407, via the rotor 410 and stator 415 can rotate the first shaft 405, which causes a corresponding rotation in the rotational section 130b of the first primary mechanical flexure 130, a first portion of the rotary position measuring device (such as the encoder wheel 420), the device mounting platform 105, the aimed device 150, the second shaft 430, a portion of the brake system 425, and the rotational section 135b of the second primary mechanical flexure 135. Another portion of the rotary position measuring device (such as the encoder head), stationary section 130a of the first primary mechanical flexure 130, stationary section 135a of the second primary mechanical flexure 135, and another portion of the brake system 425 do not rotate in response to the motor 407. As the first shaft 405 is rotated by the motor 407, potential torque energy in the direction opposite rotation builds up in both the first and second primary mechanical flexures 130, 135 as the rotational sections 130b, 135b rotate with respect to the corresponding stationary sections 130a, 135a. When the encoder head or another position determining portion of the rotary position measuring device (depending on the particular rotary position measuring device being employed) determines that the encoder wheel (or other portion of the rotary position measuring device) has rotated to the desired angular position, the encoder head (or other rotary position measuring device) sends a signal to the controller and/or computing device. A signal can be sent from the controller and/or computing device to engage or energize the brake 425. Once the brake 425 engages the device mounting platform 105 and/or second shaft 430, the brake system 425 holds the device mounting platform 105 and aimed device 150 rotationally in place against the stored energy in the primary mechanical flexures 130, 135. Once the brake system 425 is engaged, the controller and/or computing device can transmit a signal to the motor 407 to turn off the motor 407 or to reduce the level of torque on the motor 407 to make minor adjustments in the rotation/aiming of the device mounting platform 105 and the aimed device 150 via further smaller rotations in either direction of the first shaft 405. While the example embodiment of FIG. 4 presents the brake system 425 as being positioned adjacent to and on and/or coupled to at least a portion of the second primary mechanical flexure 135, in other example embodiments, the brake system 425 can be positioned adjacent and on and/or coupled to the first primary mechanical flexure 130, the first secondary mechanical flexure 140, or the second secondary mechanical flexure 145.

FIG. 5 is another partial cross-sectional view of another example of the rotary positioning apparatus 100 of FIG. 1A, in accordance with one example embodiment of the disclosure. Referring now to FIGS. 1A-3D and 5, the example rotary positioning apparatus 100 can include the device mount 110 having the device mounting platform 105 with the aimed device 150 positioned on or within the device mounting platform 105, as described with reference to FIGS. 2A-2C. A first shaft 405 can include a first end 401 and a distal second end 403. The first end 401 of the first shaft 405 can be coupled to the first end 210 of the device mounting platform 105 via at least a portion of the mounting apertures 230 and corresponding coupling devices (e.g., screw, bolt, rivet, adhesive, or any other materials known to those of ordinary skill in the art) positioned through the mounting apertures 230. The second end 403 of the first shaft 405 can extend axially from the first end 210 away from the device mounting platform 105 along the longitudinal axis X. In one example, the first shaft 405 can be cylindrical, however, in other example embodiments, the first shaft 405 can have other shapes. Further the first shaft 405 can be solid or include a hollow channel axially extending along a portion or the entire length of the first shaft 405.

A motor 407 can be positioned adjacent to the first shaft 405. For example, the motor 407 or a portion of the motor 407 can be positioned about the first shaft 405. The motor 407 can be electrically coupled to a power source (not shown). The power source can be either A/C or D/C and, for example, can include a rechargeable power source, such as a rechargeable battery. The motor 407 can also be communicably coupled to a controller and/or computing device (not shown) for controlling the rotation of the first shaft 405 and ultimately the rotation of the device mounting platform 105 and the aimed device 150. The controller and/or the computing device can include or can be communicably coupled to one or more processors. The one or more processors may be implemented as appropriate in hardware, software, firmware, or combinations thereof. Software or firmware implementations of the one or more processors may include computer-executable or machine-executable instructions written in any suitable programming language to perform the various functions described. Hardware implementations of the processors may be configured to execute computer-executable or machine-executable instructions to perform the various functions described. In example embodiments, the processors may be configured to execute instructions, software, and/or applications stored in memory (not shown) that is communicably coupled to the one or more processors. The one or more processors may include, without limitation, a central processing unit (CPU), a digital signal processor (DSP), a reduced instruction set computer (RISC), a complex instruction set computer (CISC), a System-on-a-Chip (SoC), a microprocessor, a microcontroller, a field programmable gate array (FPGA), or any combination thereof.

The motor 407 can be any type of A/C or D/C motor. The motor 407 can include a rotor 410 disposed about the radial circumference of the first shaft 405 and coupled or otherwise mounted to the first shaft 405. The motor 407 can also include a stator 415. The stator 415 can be coupled to the device mount 110 in certain example embodiments. In other example embodiments, the stator 415 can be coupled to the mounting arm 125 or the mounting plate 115. The stator 415 can define a hollow cylinder within which the rotor 410 and at least a portion of the first shaft 405 is positioned. The rotor 410 is operable to rotate within the stator 415 (which remains static or stationary) during operation of the motor 407 to generate a rotation in the first shaft 405 in either direction about the longitudinal axis X. The rotation of the first shaft 405 by the motor 407 causes a corresponding rotation in the device mounting platform 105 coupled to the first shaft 405 and a corresponding rotation in the aimed device 150 coupled to the device mounting platform 105.

The second end 403 of the first shaft 405 can be coupled to the first primary mechanical flexure 130. The first primary mechanical flexure 130 can be substantially the same as that shown and described in FIGS. 3A-3D or any other type of mechanical flexure. In one example, the rotational section 130b of the first primary mechanical flexure 130 can be coupled to the second end 403 of the first shaft 405 with one or more coupling devices (e.g., screws, bolts, rivets, adhesive, or any other materials known to those of ordinary skill in the art). In certain example embodiments, the stationary section 130a of the first primary mechanical flexure 130 can be coupled to the device mount 110 and a first secondary mechanical flexure 140.

Each of the first secondary mechanical flexure 140 and the second secondary mechanical flexure 145 can be constructed similar to that of the primary mechanical flexures 130, 135 or can be constructed in a different manner. For example, the secondary mechanical flexures 140, 145 can include rotational sections and stationary sections similar to that of the primary mechanical flexures 130, 135 but can include blades or foils that are made of softer or more flexible metal, alloy, plastic, composite, a combination of these materials, or any other materials currently available or developed in the future and known to those of ordinary skill in the art than the blades/foils of the primary mechanical flexures 130, 135. Alternatively, the secondary mechanical flexures can be constructed in the manner described in FIG. 6 below. In another alternative, any other type of mechanical flexure may be used for the secondary mechanical flexures 140, 145. In each example, the construction will allow the secondary mechanical flexures 140, 145 to begin or begin and complete rotation before the primary mechanical flexures 130, 135 begin rotating as the motor 407 rotates the first shaft 405. The first end of the first secondary mechanical flexure 140 can be coupled to the device mount 110 and the stationary section 130a of the first primary mechanical flexure 130 and the distal second end of the first secondary mechanical flexure 140 can be coupled to the mounting arm 125 or another portion of the mounting plate 115.

The rotary positioning apparatus 100 can also include a rotary position measuring device (e.g., encoder, resolver, potentiometer, inductosyn, Hall-effect sensor, any combination thereof, or any other device that is capable of measuring the angular displacement of the device mounting platform 105 relative to the stationary, non-rotating portion of the rotary positioning apparatus 100). The purpose of the rotary position measuring device is to provide a measure of the angular displacement of the device mounting platform 105 and the aimed device 150 mounted thereon relative to the stationary, non-rotating portion of the rotary positioning apparatus 100. In one example, the rotary position measuring device can include at least one stationary part and at least one rotating part. The stationary part of the rotary position measuring device can be mechanically coupled to the mounting arm 125 and/or the mounting plate 115. The rotating part of the rotary position measuring device can be mechanically coupled to the first or second shaft 405 via a hub. The power source for the rotary position measuring device can either be A/C or D/C and, for example, can include a rechargeable power source, such as a rechargeable battery. The rotary position measuring device can also be communicably coupled to the controller and/or computing device (not shown) much like the motor 407 for controlling and determining the rotational or angular position of the device mounting platform 105 and the aimed device 150 mounted thereon for the rotary positioning apparatus 100. In example embodiments, the rotary position measuring device can measure position, velocity, acceleration, or other higher order angular measurements that can be used by the rotary position controller (not shown) to control the aimed device's angular position about the X-axis. Examples of rotary position measuring devices can include, but are not limited to, encoders, resolvers, potentiometers, Hall-effect sensors, and/or inductosyns, any combination thereof, or any other device that is capable of measuring the angular displacement of the device mounting platform 105 and the aimed device 150 mounted thereon relative to the stationary, non-rotating portion of the rotary positioning apparatus 100. The rotary position measuring device can be electrical, mechanical, optical, or magnetic in nature.

In the example provided herein in the figures and described below, the rotary position measuring device is an encoder; however, this is for example purposes only as any other type of rotary position measuring device, including those discussed herein, may be substituted for the encoder described below. The encoder can include an encoder wheel 420. The encoder wheel 420 can be coupled to the first shaft 405 via a hub. The encoder can further include an encoder head 505. The encoder head 505 can be electrically coupled to a power source (not shown) and mechanically coupled to the mounting arm 125 and/or the mounting plate 115 or another stationary mounting area. The power source can be either A/C or D/C and, for example, can include a rechargeable power source, such as a rechargeable battery. The encoder head 505 can also be communicably coupled to the controller and/or computing device (not shown) much like the motor 407 for controlling the position of the device mounting platform 105 and the aimed device 150 mounted thereon. The encoder head 505 can monitor the rotational position of the encoder wheel 420 to determine the amount of rotation of the first shaft 405 about the longitudinal axis X and correspondingly the amount of rotation of the device mounting platform 105 and aimed device 150 therein or thereon about the longitudinal axis X. In one example, the encoder is an optical encoder; however, other types of encoders may be alternatively used.

The rotary positioning apparatus 100 can also include a second shaft 430 coupled to the second end 205 of the device mounting platform 105. The second shaft 430 can include a first end 427 and a distal second end 429. The first end 427 of the second shaft 430 can be coupled to the second end 205 of the device mounting platform 105 via at least a portion of the mounting apertures 220 and corresponding coupling devices (e.g., screw, bolt, rivet, adhesive, or any other materials known to those of ordinary skill in the art) positioned through the mounting apertures 220. The second end 429 of the second shaft 430 can be coupled to the rotating section 135b of the second primary mechanical flexure 135 and a brake system 425. The second end 429 of the second shaft 430 can extend axially from the second end 205 away from the device mounting platform 105 along the longitudinal axis X and in a direction opposite the direction of extension of the first shaft 405. In one example, the second shaft 430 can be cylindrical, however, in other example embodiments, the second shaft 430 can have other shapes. Further the second shaft 430 can be solid or include a hollow channel axially extending along all or a portion of the entire length of the second shaft 430.

The rotary positioning apparatus 100 can also include a brake system 425. The brake system 425 can be electrically coupled to a power source (not shown). The power source can be either A/C or D/C and, for example, can include a rechargeable power source, such as a rechargeable battery. The brake system 425 can also be communicably coupled to the controller and/or computing device (not shown) much like the motor 407 for controlling the rotational position of the device mounting platform 105 and the aimed device 150 mounted thereon.

The brake system 425 can include a first portion coupled to the device mount 110 or another mounting surface that will not rotate when the motor 407 applies a rotational torque to the first shaft 405. Another portion of the brake system 425 can be coupled to the second end 205 of the device mounting platform 105 and/or the second shaft 430. The brake system 425 includes a brake armature that can employ a frictional force on the device mounting platform 105 or second shaft 430 to stop or prevent rotation of the device mounting platform 105. The energizing of the brake system 425 to stop rotation of the device mounting platform 105 can occur when the controller and/or computing device have determined, based on information from the rotary position measuring device, that the device mounting platform 105 and the aimed device 150 therein or thereon has been rotated to the desired angular position (and optionally an additional determined amount past the desired angular position) about the longitudinal axis X. In certain example embodiments, once the brake system 425 is applied to stop rotation or to hold the device mounting platform 105 and the aimed device 150 in place, the motor 407 will not need to continue applying a rotational force on the first shaft 405 to maintain the position of the device mounting platform 105 against the stored rotational energy in the first primary mechanical flexure 130 and the second primary mechanical flexure 135.

The second primary mechanical flexure 135 can be substantially the same as that shown and described in FIGS. 3A-3D or alternatively can be any other type of mechanical flexure known to those of ordinary skill in the art. In one example, the rotational section 135b of the second primary mechanical flexure 135 can be coupled to the second end 429 of the second shaft 430 with one or more coupling devices (e.g., screws, bolts, rivets, adhesive, or any other materials known to those of ordinary skill in the art). In certain example embodiments, the stationary section 135a of the second primary mechanical flexure 135 can be coupled to the mounting end 435 of the device mount 110 and a second secondary mechanical flexure 145. The first end of the second secondary mechanical flexure 145 can be coupled to the mounting end 435 of the device mount 110 and the stationary section 135a of the second primary mechanical flexure 135. The distal second end of the second secondary mechanical flexure 145 can be coupled to the mounting arm 120, the mounting plate 115 or another stationary mounting surface.

Referring to FIG. 5, in operation, the motor 407 can receive a signal from the controller or processor of the computing device to adjust the angular position of the aimed device 150. The motor 407, via the rotor 410 and stator 415 can rotate the first shaft 405, which first causes a corresponding rotation in the first secondary mechanical flexure 140 and the second secondary mechanical flexure 145 as well as a first portion of the rotary position measuring device (such as the encoder wheel 420) the device mounting platform 105, the aimed device 150, a portion of the brake system 425 and the second shaft 430. Once the first secondary mechanical flexure 140 and the second secondary mechanical flexure 145 reach their rotational limits (e.g., bottoms our or ceases to rotate further) the rotational force applied by the motor 407 on the first shaft 405 will also cause a corresponding rotation in the rotational section 130b of the first primary mechanical flexure 130, the first portion of the rotary position measuring device (such as the encoder wheel 420), the device mounting platform 105, the aimed device 150, the second shaft 430, the portion of the brake system 425, and the rotational section 135b of the second primary mechanical flexure 135. Another portion of the rotary position measuring device (such as the encoder head), stationary section 130a of the first primary mechanical flexure 130, stationary section 135a of the second primary mechanical flexure 135, and another portion of the brake system 425 do not rotate in response to the motor 407.

As the first shaft 405 is rotated by the motor 407, potential torque energy in the direction opposite rotation builds up first in both the first and second secondary mechanical flexures 140, 145 due to them both having a lower torque level for rotation than the first and second primary mechanical flexures 130, 135. Once the first and second secondary mechanical flexures 140, 145 reach their rotational limits, potential torque energy in the direction opposite rotation builds up in the first and second primary mechanical flexures 130, 135 as the rotational sections 130b, 135b rotate with respect to the corresponding stationary sections 130a, 135a. When the encoder head or another position determining portion of the rotary position measuring device (depending on the particular rotary position measuring device being employed) determines that the encoder wheel (or other portion of the rotary position measuring device) has rotated to the desired angular position or past the desired angular position by a known error amount and/or the desired angular position plus the rotational limit of the secondary mechanical flexures 140, 145, the encoder head (or other rotary position measuring device) sends a signal to the controller and/or computing device. A signal can be sent from the controller and/or computing device to engage or energize the brake system 425. Once the brake system 425 engages the device mounting platform 105 and/or second shaft 430, the brake 425 system holds the device mounting platform 105 and aimed device 150 rotationally in place against the stored energy in the primary mechanical flexures 130, 135. Once the break system 425 is engaged, the controller and/or computing device can transmit a signal to the motor 407 to turn off the motor 407 or to reduce the level of torque on the motor 407 to make minor adjustments in the rotation/aiming of the device mounting platform 105 and the aimed device 150 via further smaller rotations of the first shaft 405 in either direction about the X-axis.

In situations where the motor 407 is turned off, the usage of the brake system 425 saves the motor 407 from having to hold the device mounting platform 105 and aimed device 150 in place, thus reducing power usage by the motor 407. In certain example embodiments, once the motor operation ceases, the secondary mechanical flexures 140, 145 can then use their stored potential torque energy to rotate the device mounting platform 105 and the aimed device 150 with respect to the mounting plate 115 or other stationary platform back in the opposite direction of the rotation caused by the motor 407. This use of the secondary mechanical flexures 140, 145 can be used to account for known errors in rotation. In one example, this rotation is less than approximately 5 degrees and preferable substantially less than approximately 3 degrees and more preferable substantially less than approximately 1 degree of rotation.

Alternatively, the motor 407 can continue to engage the first shaft 405 to control rotation of the device mounting platform 105 and aimed device 150. In this situation, with the brake system 425 engaged, the motor 407 now only operates against the stored torque energy of the secondary mechanical flexures 140, 145 which is less than that of the primary mechanical flexures 130, 135 and thus, requires less power usage at the motor 407 than the motor 407 trying to adjust the position of the device mounting platform 105 against the primary mechanical flexures 130, 135.

Figure 6A:
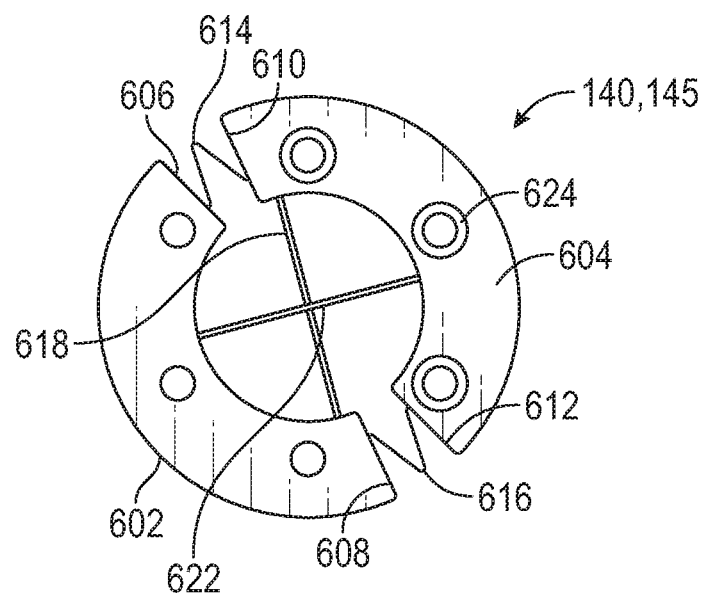
FIG. 6A is a top plan view of a secondary mechanical flexure, in accordance with one example embodiment of the disclosure.
Figure 6B:
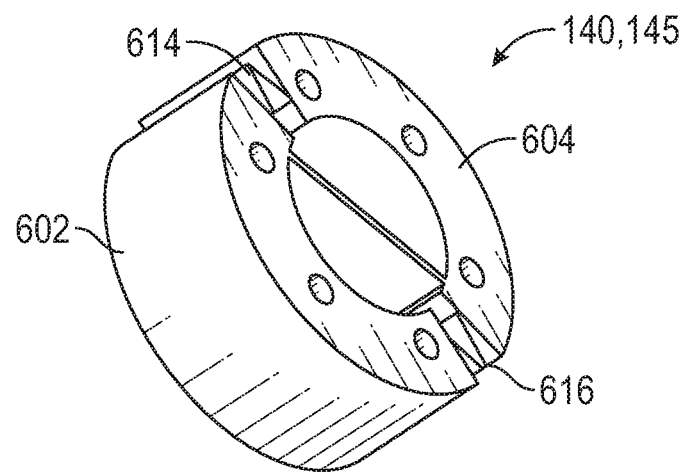
FIG. 6B is a perspective view of the secondary mechanical flexure of FIG. 6A, in accordance with one example embodiment of the disclosure.

FIGS. 6A-6B are top plan and perspective views of a secondary mechanical flexure 140, 145 for use with the rotary positioning apparatus 100 of FIGS. 1A, 4, and 5, in accordance with one example embodiment of the disclosure. While FIGS. 6A-6B provide one example of a secondary mechanical flexure 140, 145, the description is not intended to be limiting as any other type of mechanical rotary flexure known to those of ordinary skill in the art may be substituted for the secondary mechanical flexures 140, 145 described herein. Now referring to FIGS. 6A-6B, the secondary mechanical flexure 140, 145 can include a first member 602 and a second member 604. In one example, each of the first member 602 and the second member 604 can be arcuate members with an arc of less than 180 degrees and preferably between substantially 120 degrees to substantially 175 degrees and more preferable between substantially 140 degrees and substantially 165 degrees.

The first member 602 has a first end 606 and a distal second end 608. The second member 604 has a first end 610 and a distal second end 612. The secondary mechanical flexure 140, 145 can also include a spring 614 extending between and coupling the first end 606 of the first member 602 to the first end 610 of the second member 604. The secondary mechanical flexure 140, 145 can also include a second spring 616 extending between and coupling the second end 608 of the first member 602 to the second end 612 of the second member 604.

Each secondary mechanical flexure 140, 145 provides mechanical resistance to rotation away from a central null point in either direction of rotation about the X-axis. In one example, that null point can be considered zero degrees of rotation. This mechanical resistance may be used in combination with other parts of the rotary positioning apparatus 100 to provide an increasing level of resistance (as the angle away from the null point increases) to the rotation of the device mounting platform 105 and the aimed device 150 about the axis X in either direction to a desired angle with respect to its resting position or null point. Under rotation, the secondary mechanical flexures 140, 145 provide a source of stored energy that allows the device mounting platform 105 and the aimed device 150 to return to its null point or zero degrees of rotation with a minimum level of torque added by a motor 407 or brake system 425 during the return process.

Desirable characteristics of the secondary mechanical flexures 140, 145 include high axial and radial stiffness. In addition, it is desirable that the central compliant axis 622 of the secondary mechanical flexure 140, 145 be substantially stationary throughout rotation of the first 602 and second 604 members about the axis X. Also, the secondary mechanical flexures 140, 145 can includes blades or foils 618, 620 and springs 614, 616 that are more flexible and require less torque to rotate as compared to the primary mechanical flexures 130, 135 so that the secondary mechanical flexures 140, 145 will begin rotating and generating stored torque energy before the rotational sections 130b, 135b of the primary mechanical flexures 130, 135 begin rotating with respect to the corresponding stationary sections 130a, 135a. Also, since the secondary mechanical flexures 130, 135 are bearingless the use of the secondary mechanical flexures 140, 145 eliminates friction, increases reliability, increases cleanliness, and eliminates issues that occur at cryogenic temperatures, as compared to bearings.

In one example, the secondary mechanical flexure 140, 145 can be a bi-foil flexure in references to the two blades 618, 620 that extend through the common central axis 622 (also referred to as a quad-foil if each portion extending from the common central axis 622 is considered a separate and distinct blade). In other example embodiments, the secondary mechanical flexure 140, 145 can be a tri-foil (e.g., three blades (also referred to as a hex-foil if each portion extending from the common central axis 622 is considered a separate and distinct blade)) a quad-foil flexure (e.g., four blades (also referred to as a oct-foil or eight blade foil if each portion of the blade extending from the common central axis 622 is considered a separate and distinct blade)), or the like. In the bi-foil blade configuration two blades (foils) 618, 620 pass through or extend out from common central axis 622. The blades 618, 620 can be spread symmetrically or asymmetrically about the common central axis 622. In certain example embodiments, the common central axis 620 is aligned with or parallel with the longitudinal axis X of the rotary positioning apparatus 100. Each of the blades (foils) 618, 620 have a first end coupled to the first member 602 and a second distal end coupled to the second member 604 as they pass through the common central axis 622.

In certain example embodiments, the bi-foil blade configuration of blades 618, 620 may be constructed from a single piece of material through a suitable machining process. One example of a suitable machining process for making the bi-foil blade configuration is sink electrodischarge machining. However, any other method for making all or any portion of the secondary mechanical flexures 140, 145 may be used. The secondary mechanical flexures 140, 145 have been found to have suitable characteristics in terms of stiffness and torque levels.

Though the disclosed example includes a particular arrangement of a number of parts, components, features, and aspects, the disclosure is not limited to only that example or arrangement. Any one or more of the parts, components, features, and aspects of the disclosure can be employed alone or in other arrangements of any two or more of the same.

Although rotary positioning of optical device features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A rotary positioning apparatus comprising:
a device mount comprising a first end and a distal second end;
a motor coupled to the first end of the device mount and configured to rotate the device mount about a longitudinal axis of the device mount;
a first mechanical flexure comprising a first end and a distal second end, wherein the first end of the first mechanical flexure is coupled to the first end of the device mount;
a second mechanical flexure comprising a first end and a distal second end, wherein the first end of the second mechanical flexure is coupled to the second end of the first primary mechanical flexure; and
a third mechanical flexure comprising a first end and a distal second end, wherein the first end of the third mechanical flexure is coupled to the second end of the device mount,
wherein each of the first mechanical flexure and third mechanical flexure comprises:
a stationary section;
a rotational section, wherein the rotational section rotates relative to the stationary section; and
a plurality of blades, wherein each of the plurality of blades comprises a first blade end and a distal second blade end, wherein the first blade end is coupled to the stationary section and the second blade end is coupled to the rotational section.

2. The rotary positioning apparatus of claim 1, wherein the device mount further comprises a first shaft extending axially along the first end of the device mount, wherein the first end of the first mechanical flexure is coupled to the first shaft.

3. The rotary positioning apparatus of claim 2, wherein the device mount further comprises:
a second shaft extending axially along the second end of the device mount;
wherein the first end of the third mechanical flexure is coupled to the second shaft.

4. The rotary positioning apparatus of claim 2, further comprising a rotary position measuring device.

5. The rotary positioning apparatus of claim 1, further comprising a fourth mechanical flexure comprising a first end and a distal second end, wherein the first end of the fourth mechanical flexure is coupled to the second end of the third mechanical flexure.

6. The rotary positioning apparatus of claim 5, further comprising a brake system configured to maintain a rotary position of the device mount about the longitudinal axis.

7. The rotary positioning apparatus of claim 5, further comprising:
a first mounting surface; and
a second mounting surface;
wherein the second end of the second mechanical flexure is coupled to the first mounting surface; and
wherein the second end of the fourth mechanical flexure is coupled to the second mounting surface.

8. The rotary positioning system of claim 1, further comprising an aimed device coupled to the device mount.

9. A rotary positioning apparatus comprising:
a device mount comprising a first end and a distal second end;
an aimed device coupled to the device mount;
a first shaft coupled to the first end of the device mount;
a second shaft coupled to the second end of the device mount;
a motor coupled to the first shaft and configured to rotate the first shaft, the device mount, and the aimed device about a longitudinal axis of the device mount;
a first mechanical flexure comprising a first end and a distal second end, wherein the first end of the first mechanical flexure is coupled to the second shaft;

a second mechanical flexure comprising a first end and a distal second end, wherein the first end of the second mechanical flexure is coupled to the first mechanical flexure; and a brake system, wherein at least a portion of the brake system is disposed between the first mechanical flexure and the second end of the device mount.

10. The rotary positioning apparatus of claim 9, further comprising a third mechanical flexure comprising a first end and a distal second end, wherein the first end of the third mechanical flexure is coupled to the first shaft; and a fourth mechanical flexure comprising a first end and a distal second end, wherein the first end of the fourth mechanical flexure is coupled to the second end of the third mechanical flexure.

11. The rotary positioning apparatus of claim 10, further comprising:

a first mounting surface; and a second mounting surface;

wherein the second end of the fourth mechanical flexure is coupled to the first mounting surface; and wherein the second end of the second mechanical flexure is coupled to the second mounting surface, wherein the device mount, the aimed device, the first shaft, and the second shaft, rotate relative to the first mounting surface and the second mounting surface.

12. The rotary positioning apparatus of claim 10, wherein each of the first mechanical flexure and the third mechanical flexure maintains a substantially invariant central axis location under rotation.

13. The rotary positioning apparatus of claim 9, further comprising a rotary position measuring device, wherein at least a portion of the rotary position measuring device is coupled to the first shaft.

14. The rotary positioning apparatus of claim 9, wherein the first mechanical flexure comprises a first stationary section and a first rotational section, wherein the first rotational section rotates relative to the first stationary section, wherein the first rotational section is coupled to the second shaft and wherein at least a portion of the brake system is disposed between the second end of the device mount and the first rotational section of the first mechanical flexure.

15. The rotary positioning apparatus of claim 14, wherein the brake system is configured to engage at least a portion of the device mount to maintain a rotary position of the device mount relative to the longitudinal axis.

16. The rotary positioning apparatus of claim 14, wherein the second mechanical flexure is coupled to the first stationary section of the first mechanical flexure.

17. The rotary positioning apparatus of claim 14, wherein the first mechanical flexure further comprises a plurality of blades, wherein each of the plurality of blades comprises a first blade end and a distal second blade end, wherein the first blade end is coupled to the first stationary section and the second blade end is coupled to the first rotational section.

18. A system for rotary positioning of an aimed device comprising:

a power source;

a computing device electrically coupled to the power source;

a rotary positioning apparatus comprising:

a device mount comprising a first end and a distal second end;

the aimed device coupled to the device mount;

a first shaft coupled to the first end of the device mount;

a second shaft coupled to the second end of the device mount;

a motor coupled to the first shaft, electrically coupled to the power source and communicably coupled to the computing device, wherein the motor is configured to rotate the first shaft and the device mount about a longitudinal axis of the device mount;

a first mechanical flexure comprising a first stationary section and a first rotational section, wherein the first rotational section rotates relative to the first stationary section and wherein the first rotational section is coupled to the second shaft;

a second mechanical flexure coupled to the first stationary section of the first mechanical flexure;

a brake system electrically coupled to the power source and communicable coupled to the computing device, wherein the brake system is configured to maintain a rotary position of the device mount about the longitudinal axis; and a rotary position measuring device electrically coupled to the power source and communicably coupled to the computing device, wherein the rotary position measuring device is configured to determine a rotational displacement of the aimed device about the longitudinal axis.

* * * * *